United States Patent [19]
Brewer, III

[11] Patent Number: 5,890,695
[45] Date of Patent: Apr. 6, 1999

[54] NON-OBTRUSIVE SHIPBOARD VIBRATION MOUNT FOR COPIER/PRINTERS

[75] Inventor: Charles R. Brewer, III, Farmington, N.Y.

[73] Assignee: Xerox Corporation, Stamford, Conn.

[21] Appl. No.: 827,588

[22] Filed: Mar. 28, 1997

[51] Int. Cl.$^6$ .................................................. F16M 1/00
[52] U.S. Cl. .................. 248/638; 248/346.05; 248/421; 248/656; 254/10 C
[58] Field of Search .................................... 248/638, 669, 248/676, 678, 421, 346.05, 346.06; 254/10 C, 126; 114/270

[56] References Cited

U.S. PATENT DOCUMENTS

| | | | |
|---|---|---|---|
| 318,145 | 5/1885 | Smith | 254/10 C |
| 1,032,453 | 7/1912 | Unger | 254/10 C |
| 1,510,328 | 9/1924 | Mussina et al. | 254/10 C |
| 2,441,510 | 5/1948 | Robinson | 248/678 |
| 2,511,073 | 6/1950 | McCandless | 254/10 C |
| 2,587,067 | 2/1952 | Sachtleber | 254/10 C |
| 2,624,535 | 1/1953 | Bollhoefer | 248/669 |
| 2,840,346 | 6/1958 | DuMoulin | 248/10 C |
| 3,469,809 | 9/1969 | Reznick et al. | 248/638 X |
| 4,934,647 | 6/1990 | Edwards | 248/346.06 X |
| 4,941,797 | 7/1990 | Smillie, III | 254/126 X |
| 5,560,313 | 10/1996 | Brewer, III et al. | 114/270 |

*Primary Examiner*—Derek J. Berger
*Attorney, Agent, or Firm*—William A. Henry

[57] ABSTRACT

A simple system for mechanically lifting and securing a copier/printer to vibration isolators aboard a Naval vessel. The system is compact, occupying space only under the copier/printer and not protruding from the sides and allows the copier/printer to completely detach for servicing. The system includes a four bar linkage using two square supporting members as the chassie with the four bar linkage being mounted to vibration isolators that are welded to the deck of the vessel. The four bar linkage is manipulated by two screws to easily and quickly raise the copier/printer off its casters and restrain it in a fixed position. The two screws make detachment from the four bar linkage a simple and time efficient process for repairpersons.

11 Claims, 2 Drawing Sheets

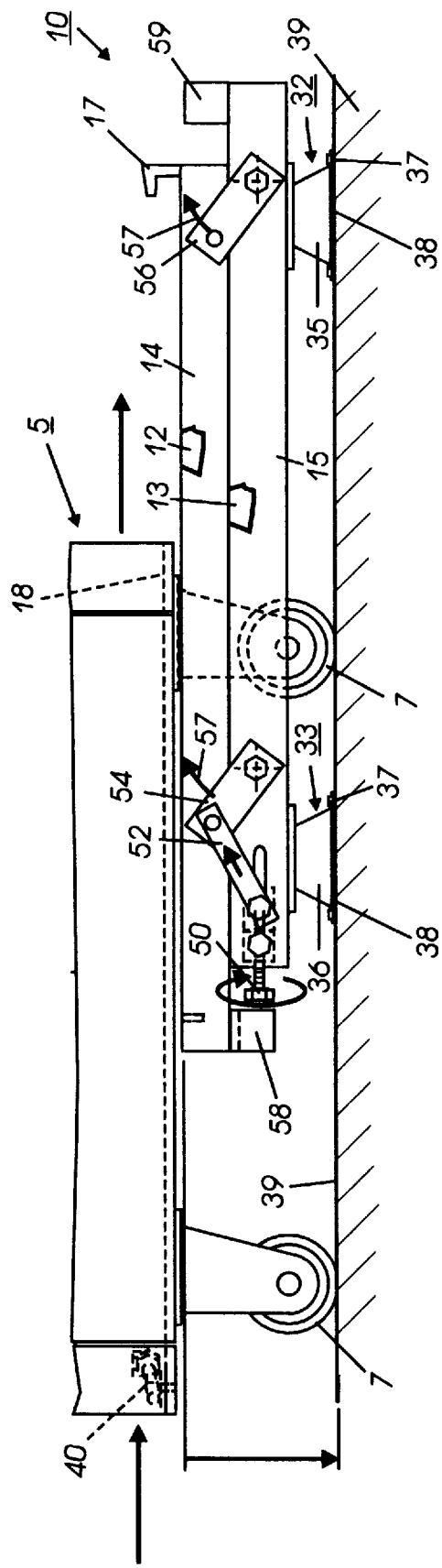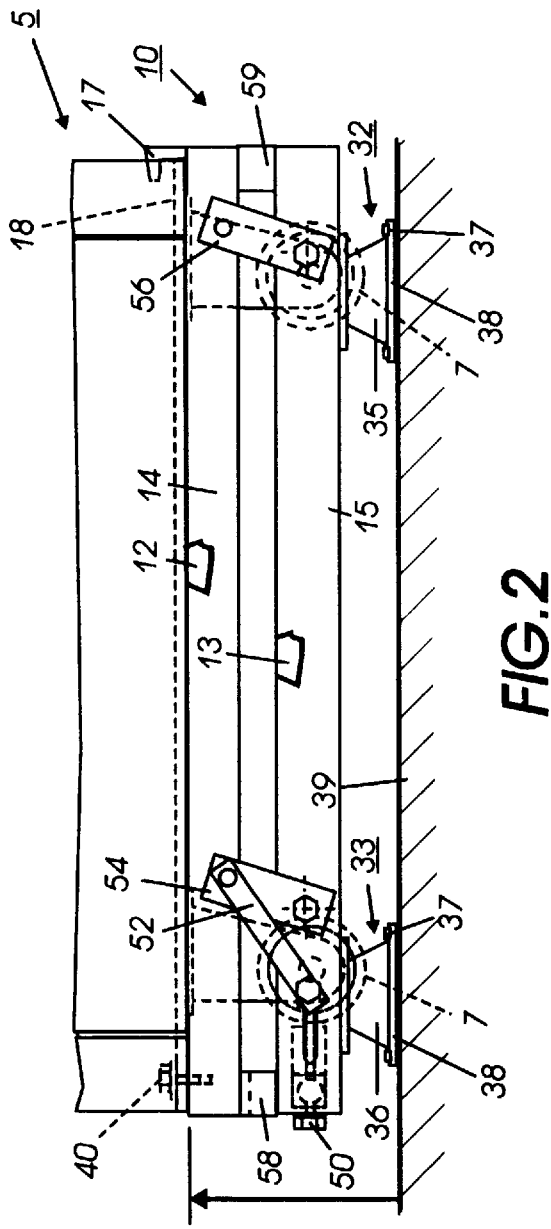

NON-OBTRUSIVE SHIPBOARD VIBRATION MOUNT FOR COPIER/PRINTERS

BACKGROUND OF THE INVENTION

1. Field of the Invention

This invention relates to a frame for mounting a machine or other apparatus to a ship, and more particularly, to a shock mount frame for mounting a copier/printer to a ship.

2. Description of the Prior Art

Along with the need to make copies of documents onboard ships came the problem of how to mount the copy making product so as to make producing copies feasible. Unstable copy making products produced unacceptable copy and an unacceptable amount of downtime of the copy making products due to shock with parts being shaken loose and broken, as well as, misregistration of images on copy sheets. Repairpersons have to go through time consuming, costly and difficult procedures in moving the copy making products to gain access to parts thereof that need servicing and then replacing the copy making product in their original position. An answer to these problems included shock mounting the copy making products to the ship.

One of the first designs for shock mounting a copier to a ship included permanently attaching the copier to mounts that were welded to the ships deck. If service were needed the copier was either repaired in place (sometimes in very tight quarters) or the machine was taken off the mounts, which could take up to half an hour or more.

In U.S. Pat. No. 5,560,313 a shock mounting assembly is shown for attaching a copier/printer to mounts aboard a Naval vessel. The apparatus includes two steel supporting members attached to the base of the copier/printer that are easily and quickly screwed into two nonparallel shock mount frames with four jack screws to raise the copier/printer off its casters and restrain it in a fixed position. The four jack screws make detachment from the shock mount assembly a simple and time efficient process for repairpersons.

Another design used incorporated a "C" type frame that allowed the machine to be inserted into the frame, attached to the frame, and then the assembly moved and jacked into position. This design required that the machine be attached to a permanent frame before placing into position. Also, the frame configuration prevented machine placement in tight quarters otherwise the frame would not clear the welded deck mounts if moved into position and no side movement allowed.

Other designs incorporate a heavy wound spring inside a woven steel sleeve. This is laid out on its side and the machine is permanently attached to the spring. (similar to a slinky laying on its side) Again, the machine is either serviced in place or removed, involving time and energy to remove and replace back onto the mount.

SUMMARY OF THE INVENTION

Accordingly, disclosed herein is a simple system for mechanically lifting and securing a copier/printer to vibration isolators aboard a Naval vessel. The system is compact, occupying space only under the copier/printer and not protruding from the sides and allows the copier/printer to completely detach for servicing. The system includes a four bar linkage using two square supporting members as the chassie with the supporting members being mounted to vibration isolators that are welded to the deck of the vessel. The four bar linkage is manipulated by two screws to easily and quickly raise the copier/printer off its casters and restrain it in a fixed position. The two screws make detachment from the four bar linkage a simple and time efficient process for repairpersons.

BRIEF DESCRIPTION OF THE DRAWINGS

All of the above-mentioned features and other advantages will be apparent from the example of one specific apparatus and its operation described hereinbelow. The invention will be better understood by reference to the following description of this one specific embodiment thereof, which includes the following drawing figures (approximately to scale) wherein:

FIG. 1 is a schematic side view of an electrophotographic machine being moved for mounting in the vibration mount assembly of the present invention on the deck of a vessel.

FIG. 2 is a partial, side view showing the electrophotographic machine mounted on the shock mount assembly of FIG. 1.

DETAILED DESCRIPTION OF THE INVENTION

Figure 3:
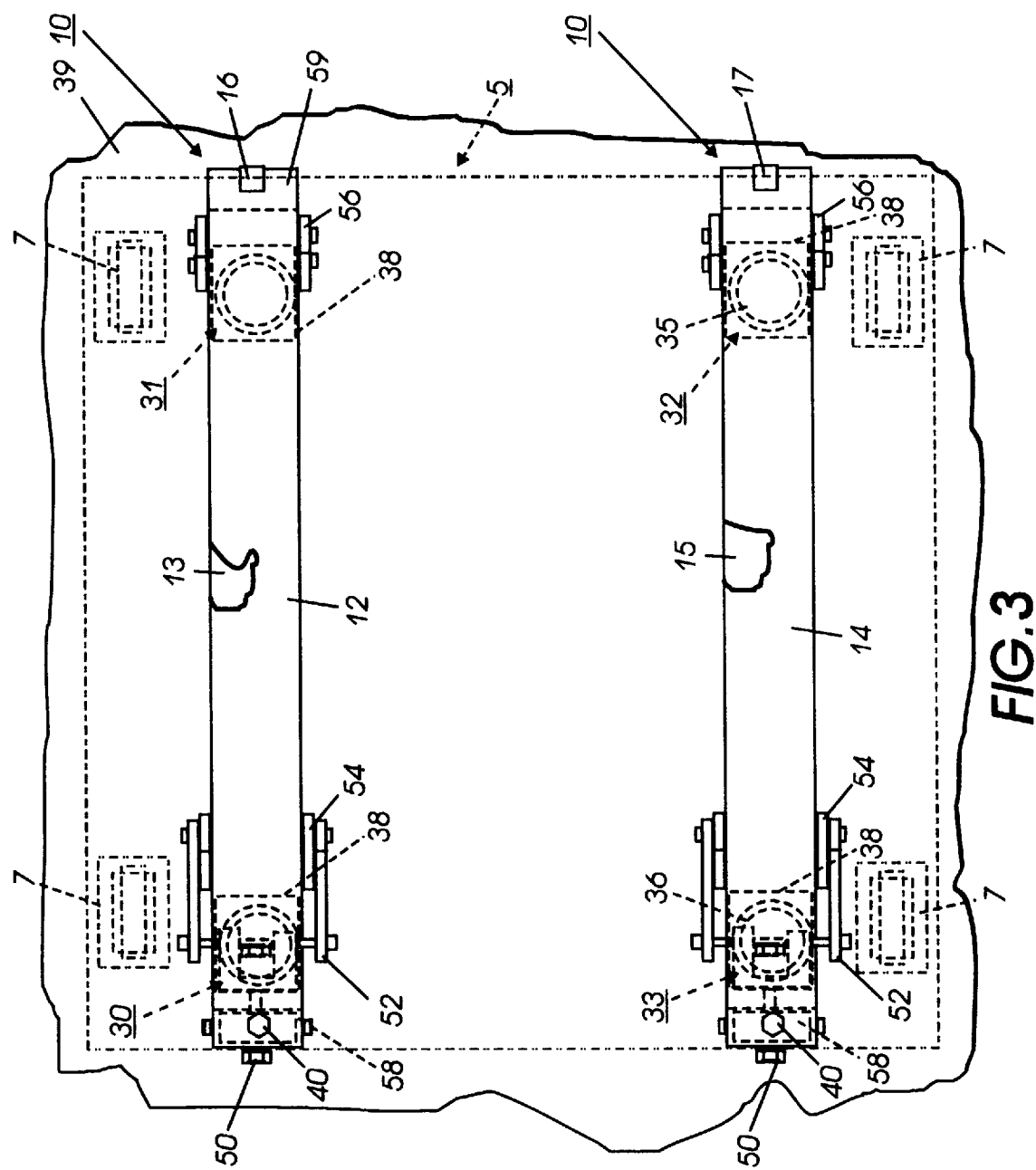
FIG. 3 is an enlarged, partial plan view of the shock mount assembly shown in FIG. 2 with the four bar linkage expanded into its copier/printer anti-vibration position.

For a general understanding of the features of the present invention, reference is made to the drawings. In the drawings, like reference numerals have been used throughout to identify identical elements. Referring to FIG. 1, there is shown an electrophotographic printing machine 5 composed of a plurality of programmable components and sub-systems which cooperate to carry out the copying or printing programs through a touch dialogue User Interface. However, it should be understood that the vibration mount assembly of the present invention can be used with any machine that requires stabilizing onboard a ship.

Exemplary, conventional machine 5 shown here in phantom block form and shown in U.S. Pat. No. 5,049,929 which is incorporated herein by reference, employs a recirculating document handler having a document support surface onto which documents are placed. The documents are fed individually to an imaging station where they are imaged onto a photoconductive belt corresponding to the informational areas contained within a document at the imaging station. After imaging, each document is returned to the document handler support surface via a simplex path when either a simplex copy or the first pass of a duplex copy is being made or via a duplex path when a duplex copy is being made. Each image is developed on the photoreceptor, transferred and fused to copy sheets fed from a paper tray to an output tray or finisher. As a set of original document is loaded into the document handler, each document is transported by the document handler to the top of processor where copies are made. Upon completion, the original document will be transported back to the top of the document handler.

As shown in FIGS. 1–3, and in accordance with the present invention, a non-obtrusive vibration mount system 10 comprises a four bar linkage of square tubes 12, 13, 14, and 15 with two of the tubes serving as the chassis for mounting the copier/printer 5. A pair of hook-shaped roll-in attachment bars 16 and 17 extending from tubes 12 and 14, respectively, are connectable to a plate 18 that is attached to the base of machine 5. Once machine 5 is located and secured in the rear by hook-shaped bars 16 and 17, bolts 40 are secured through the base of the machine 5 and into the front of tubes 12 and 14. Square shaped tubes 13 and 15 are attached to vibration isolators 30, 31 and 32, 33, respectively, that are welded to the deck 39 of a vessel (not shown) by conventional means. As shown more clearly in FIG. 2, vibration isolators 32 and 33 include insulative, rubber-like boots 35 and 36, anchor members 38 and tie down bolts 37. vibration isolators 30 and 31 are identical in make-up to vibration isolators 32 and 33. Driving bolts 50 are threaded into both tubes 13 and 15 and conventionally, drivingly connected to linkage members 52, 54 and 56 that are pivoted on the outside surfaces of tubes 13 and 15 in the direction of the arrows when driving bolt 50 is rotated clockwise. This separates tubes 13 and 15 from tubes 12 and 14 while simultaneously lifting machine 5 of its casters 7. Rotation of driving bolt 50 counterclockwise brings the tubes together and at the same time places casters of the machine back onto the deck of the vessel. This configuration allows the machine to be easily detached from the vibration isolators and rolled away from the stationary vibration mount assembly 10 for repair by a technician.

In operation of the vibration mount assembly 10, a machine 5 is rolled over the top of tubes 12 and 14 and machine plate 18 is positioned under hook-shaped members 16 and 17 and secured in position by bolts 40. Then the two driving bolts 50 in the front of each tube 12 and 14 are rotated clockwise, driving the linkage 52, 54 and 56 up and over center with the tubes moving in the direction of arrow 57 and coming to rest on blocks 58 and 59 attached to opposite ends of the tubes as shown in FIG. 3. This allows the machine to be rolled into place on its own casters, then lifted off its casters and secured on vibration isolation members. To lower the machine, the driving bolts are rotated counterclockwise until the tubes are retracted and the machine is again resting on its casters. Advantages of this machine mounting system include: fast mounting and dismounting of the machine onto and off of the tubes by one technician allowing easier servicing of shipboard machines; and no work is needed for attachment to the tubes from behind the machine, therefore, tighter shipboard accommodations will suffice for machine installation.

As will be readily understood from the foregoing description, a method and apparatus for shock mounting a machine to the deck of a vessel has been disclosed that provides a simple means of mechanically lifting and securing a copier/printer against vibration. The system enables a technician to dismount and mount the copier/printer with respect to two pairs of tubes in a quick and efficient manner. The tubes are positioned orthogonal to the longest dimension of the copier/printer.

The invention has been described in detail with particular reference to the preferred embodiment thereof, but it will be understood that reasonable variations and modifications are possible without departing from the spirit and basic scope of the invention.

I claim:

1. An apparatus for mounting a machine for making copies of page image information to the deck of a vessel in order to diminish vibration of the machine, comprising:

at least two pair of attachment members with one member each of said at least two pair of attachment members being movable from a first position atop the other of said at least two pair of attachment members to a second position spaced from said other of said at least two pair of attachment members, and wherein each said at least two pair of attachment members include blocks attached at opposite ends;

a linkage mechanism connecting each of said one member of said at least two pair of attachment members to said other of said at least two pair of attachment members for relative movement, and wherein said one member each of said at least two pair of attachment members rests on said blocks and the other of said at least two pair of attachment members when said one member each of said at least two pair of attachment members is moved to said second position;

at least four vibration isolators adapted to be stationary attached to a support structure and to said other of said at least two pair of attachment members; and driving bolts connected to said linkage mechanism such that manipulation of said driving bolts clockwise serves to lift and secure the machine off of said support structure.

2. The apparatus of claim 1, wherein said two pair of attachment members are tubes.

3. The apparatus of claim 2, wherein said driving bolts include at least two bolts.

4. The apparatus of claim 2, wherein said tubes are made of steel.

5. The apparatus of claim 4, wherein said steel tubes are square.

6. The apparatus of claim 1, wherein said one member each of said at least two pair of attachment members includes a hook-shaped member at one end thereof.

7. The apparatus of claim 6, wherein each of said vibration isolators include a flexible boot.

8. A non-obtrusive shipboard vibration mount for attaching copier/printers to a ship to enhance serviceability of the copier/printers, comprising:

first pair of attachment members having blocks at one end thereof;

a second pair of attachment members parallel to said first pair of attachment members and having blocks at opposite ends thereof;

linkage members connecting said first pair of attachment members to said second pair of attachment members for relative movement to each other from a first position atop each other to a second position spaced from each other and resting on said block at said opposite ends of said first and second pair of attachment members;

at least four vibration isolators attached to said second pair of attachment members adapted to be attached to a support structure; and driving bolts connected to each of said second pair of attachment members and said linkage members such that manipulation of said driving bolts in a first direction serves to lift said first pair of attachment members and manipulation of said driving bolts in a second direction serves to lower said first pair of attachment members.

9. The apparatus of claim 8, wherein said first and second pair of attachment members are tubes.

10. The apparatus of claim 9, wherein said driving bolts include at least two bolts.

11. The apparatus of claim 8, wherein each of said first attachment members include a hook-shaped member at one end thereof.

* * * * *